US012459165B2

(12) United States Patent
Kida et al.

(10) Patent No.: US 12,459,165 B2

(45) Date of Patent: Nov. 4, 2025

(54) APPARATUS FOR TAKING OUT MOLDED PRODUCT

(71) Applicant: Yushin Precision Equipment Co., Ltd., Kyoto (JP)

(72) Inventors: Hiroki Kida, Kyoto (JP); Atsushi Shirasaki, Kyoto (JP); Kazutaka Ando, Kyoto (JP)

(73) Assignee: YUSHIN PRECISION EQUIPMENT CO., LTD., Kyoto (JP)

( * ) Notice: Subject to any disclaimer, the term of this patent is extended or adjusted under 35 U.S.C. 154(b) by 67 days.

(21) Appl. No.: 18/452,678

(22) Filed: Aug. 21, 2023

(65) Prior Publication Data

US 2024/0066763 A1 Feb. 29, 2024

(30) Foreign Application Priority Data

Aug. 23, 2022 (JP) ................................ 2022-132828

(51) Int. Cl.
*B29C 37/00* (2006.01)

(52) U.S. Cl.
CPC ...... *B29C 37/0007* (2013.01); *B29C 2037/90* (2013.01)

(58) Field of Classification Search
CPC ........... B29C 37/0007; B29C 2037/90; B29C 45/7626; B29C 2045/4266; B29C 2045/7633; B29C 2945/76006; B29C 2945/76317; B29C 2945/76421; B29C 2945/76551; B29C 2945/76561; B29C 2945/76795; B29C 2945/76899; B29C 2945/76933; B29C 45/4225; B29C 45/42; B25J 15/0616
See application file for complete search history.

(56) References Cited

U.S. PATENT DOCUMENTS

| | | | |
|---|---|---|---|
| 10,634,243 | B2 | 4/2020 | Defranceski et al. |
| 2015/0052990 | A1 | 2/2015 | Dunkmann et al. |

FOREIGN PATENT DOCUMENTS

| | | | |
|---|---|---|---|
| EP | 1 634 680 A1 | | 3/2006 |
| EP | 2 191 148 B1 | | 8/2015 |
| JP | 2010110863 A | * | 5/2010 |
| JP | 4779004 B2 | | 9/2011 |
| JP | 2017-211986 A | | 11/2017 |

OTHER PUBLICATIONS

European Search Report dated Dec. 18, 2023, Application No. 23190902.9-1014, English text, 8 pages.

* cited by examiner

*Primary Examiner* — S. Behrooz Ghorishi
(74) *Attorney, Agent, or Firm* — Rankin, Hill & Clark LLP

(57) ABSTRACT

There is provided an apparatus for taking out a molded product that facilitates setting of a user-set lower limit value while maintaining on-off control. A negative pressure control portion includes a determining portion for determining a pressure valve resumption time period that is used to resume a suctioning operation such that an inflection point does not become lower than a user-set lower limit value. The negative pressure control portion continuously performs an off operation, which is performed to keep a pressure valve closed until the pressure valve resumption time period elapses after the suctioning operation is stopped, and an on operation, which is performed to open the pressure valve and keep the pressure valve open until a negative pressure reaches a stable value or an upper limit set value, until suctioning of a molded product is canceled.

9 Claims, 7 Drawing Sheets

APPARATUS FOR TAKING OUT MOLDED PRODUCT

TECHNICAL FIELD

The present invention relates to an apparatus for taking out a molded product that has a function of reducing the amount of consumed air by performing on-off control on a negative pressure applied by a suctioning portion.

BACKGROUND ART

Japanese Patent No. 4779004 discloses a conventional apparatus for taking out a molded product configured to reduce the amount of consumed air by performing on-off control on a negative pressure applied by a suctioning portion. The conventional apparatus includes: an attachment including a suctioning portion operable to suction a molded product in a die of a molding machine; a moving mechanism operable to move the attachment according to an operation sequence determined in advance; a negative pressure generating circuit including an air flow path provided between the suctioning portion and a vacuum generating device to generate a negative pressure in a space formed between the suctioning portion and the molded product, and a pressure valve and a pressure detector, both of which are disposed in the air flow path; and a negative pressure control portion configured to control the negative pressure by controlling the vacuum generating device or the pressure valve. There is also known a technique in which an upper limit set value is used in place of a stable value. The negative pressure control portion is configured to repeatedly perform on-off control in which a suctioning operation is started by opening the pressure valve when a suctioning start instruction is received, the suctioning operation is stopped by closing the pressure valve when the negative pressure of air flowing through the air flow path reaches a stable value, and thereafter the suctioning operation is resumed by opening the pressure valve when the negative pressure reaches a user-set lower limit value that is lower than the stable value. The on-off control is performed until a suctioning stop instruction is received. The user-set lower limit value is set as desired on the basis of experience of a user himself/herself.

SUMMARY OF INVENTION

Technical Problem

According to the study by the inventors, it has been found that when a negative pressure generating circuit including a pressure valve disposed in an air flow path provided between a suctioning portion and a vacuum generating device is used, the negative pressure is not increased immediately after the pressure valve is opened, and there occurs a falling phenomenon in which the negative pressure is further reduced to an inflection point after the pressure valve is opened and thereafter is started increasing. When such a phenomenon occurs, if a user-set lower limit value is used as the timing to open the pressure valve, a molded product may fall due to a shortage of the negative pressure since the negative pressure reaches the user-set lower limit value until the negative pressure is increased. This is because the user-set lower limit value set by a worker is occasionally so low that a reduction in the negative pressure after the pressure valve is opened results in a pressure that is not enough to keep sucking up the molded product. Therefore, when the worker attempts to set a user-set lower limit value that can reduce the amount of consumed air and suppress fall of a molded product by effectively using the on-off control, the worker may have trouble in finding a user-set lower limit value that is satisfactory to the worker by setting a user-set lower limit value and performing a trial operation using the user-set lower limit value for a plurality of times.

Accordingly, an object of the present invention is to provide an apparatus for taking out a molded product that facilitates setting of a user-set lower limit value while maintaining on-off control.

Solution to Problem

The present invention provides an apparatus for taking out a molded product, including: an attachment including a suctioning portion operable to suction a molded product in a die of a molding machine; a moving mechanism operable to move the attachment according to an operation sequence determined in advance; a moving mechanism control portion configured to control the moving mechanism; a negative pressure generating circuit including an air flow path provided between the suctioning portion and a vacuum generating device to generate a negative pressure in a space formed between the suctioning portion and the molded product, and a pressure valve and a pressure detector, both of which are disposed in the air flow path, the negative pressure generating circuit having variation characteristics such that the negative pressure is reduced to an inflection point after the pressure valve is opened and then is started increasing; and a negative pressure control portion configured to control the negative pressure by controlling the vacuum generating device or the pressure valve. The negative pressure control portion of the apparatus for taking out a molded product is configured to repeatedly perform on-off control in which a suctioning operation is started by opening the pressure valve when a suctioning start instruction is received, the suctioning operation is stopped by closing the pressure valve when the negative pressure of air flowing through the air flow path reaches a stable value or an upper limit set value, and thereafter the suctioning operation is resumed by opening the pressure valve on a basis of a user-set lower limit value that is lower than the stable value or the upper limit set value. The negative pressure control portion according to the present invention includes a determining portion for determining a pressure valve resumption time period configured to determine a pressure valve resumption time period Tv that is used to resume the suctioning operation such that the inflection point does not become lower than the user-set lower limit value. The negative pressure control portion repeatedly performs an off operation to keep the pressure valve closed until the pressure valve resumption time period Tv elapses after the suctioning operation is stopped and an on operation to open the pressure valve and keep the pressure valve open until the negative pressure reaches the stable value or the upper limit set value in the on-off control. According to the present invention, the pressure valve resumption time period Tv is determined such that the inflection point of the variation characteristics of the negative pressure does not become lower than the user-set lower limit value set by the worker. Thus, it is possible to give the worker a feeling that the timing to open the pressure valve is directly determined using the user-set lower limit value. Therefore, advantageously, the work of setting the user-set lower limit value can be performed easily and smoothly compared to the related art.

The determining portion for determining a pressure valve resumption time period includes: a detecting portion for detecting a negative pressure variation tilt configured to detect a tilt A of variations in the negative pressure immediately after the negative pressure starts reducing; a first computing portion configured to compute an expected time period Tp since the negative pressure starts reducing until the negative pressure is expected to exceed the inflection point on a basis of a value Po of the negative pressure at a time when the negative pressure starts reducing, the user-set lower limit value Pu, and the tilt A; and a second computing portion configured to determine the pressure valve resumption time period Tv on a basis of the expected time period Tp.

An equation $Tp=(Po-Pu)/A$, for example, may be used as the formula that is used by the first computing portion, although the formula is not limited to the one. The computation can be performed easily and immediately using this type of equation.

The second computing portion computes the pressure valve resumption time period Tv on a basis of the expected time period Tp and a response delay time period Tw2 that is necessary for the negative pressure to rise since the suctioning operation is resumed. The pressure valve resumption time period Tv may be computed using an equation $Tv=Tp-Tw2$, for example, although the formula that is used by the second computing portion is not limited to the one. When this formula is used, the response delay time period Tw2 may be multiplied by a safety factor, as a matter of course. The computation can be performed easily and immediately using this type of equation.

There may be more than one method of determining the response delay time period Tw2, and the response delay time period Tw2 may simply be a fixed value measured through advance testing. Alternatively, the response delay time period Tw2 may be an idle-suctioning response delay time period Td measured when idle suctioning is performed during a test operation or an actual molding operation when the suctioning portion is replaced. Further, the response delay time period Tw2 may be determined such that the pressure valve resumption time period Tv gradually comes close to the expected time period Tp in measurement in actual cycles.

The negative pressure control portion may be configured to be able to select a power reduction mode to reduce power consumption by the vacuum generating device by performing on-off control on the pressure valve, a non-power reduction mode in which the on-off control is not performed, and a medium power reduction mode in which the on-off control on the pressure valve is variably performed so that the power consumption is higher than that in the power reduction mode and lower than that in the non-power reduction mode. With such a configuration, a mode can be selected according to the shape of the molded product or the performance of the suctioning portion, and thus it is possible to suppress the occurrence of a molded product fall error, namely, an error that a molded product falls down due to an insufficient negative pressure. When the control mode is selectable, the operator can select not to perform the on-off control, which makes it possible to respect the intention of a skilled operator.

The control mode may be automatically selectable. The negative pressure control portion may further include a control mode determining portion configured to automatically determine the control mode. The control mode determining portion may automatically select and determine the non-power reduction mode, the power reduction mode, and the medium power reduction mode by any arbitrary selection and determination method. For example, the control mode determining portion may be configured to detect the negative pressure at a time of start of operation, and select one of the non-power reduction mode, the power reduction mode, and the medium power reduction mode according to a tilt of variations in the detected negative pressure. Alternatively, the control mode determining portion may be configured to select one of the non-power reduction mode, the power reduction mode, and the medium power reduction mode according to a tilt of variations in the negative pressure during operation. Also during operation, the control mode determining portion can select an appropriate control mode according to variations in the negative pressure due to changes of the suction nozzle over time if changes in the control mode are enabled.

DESCRIPTION OF EMBODIMENTS

Figure 1:
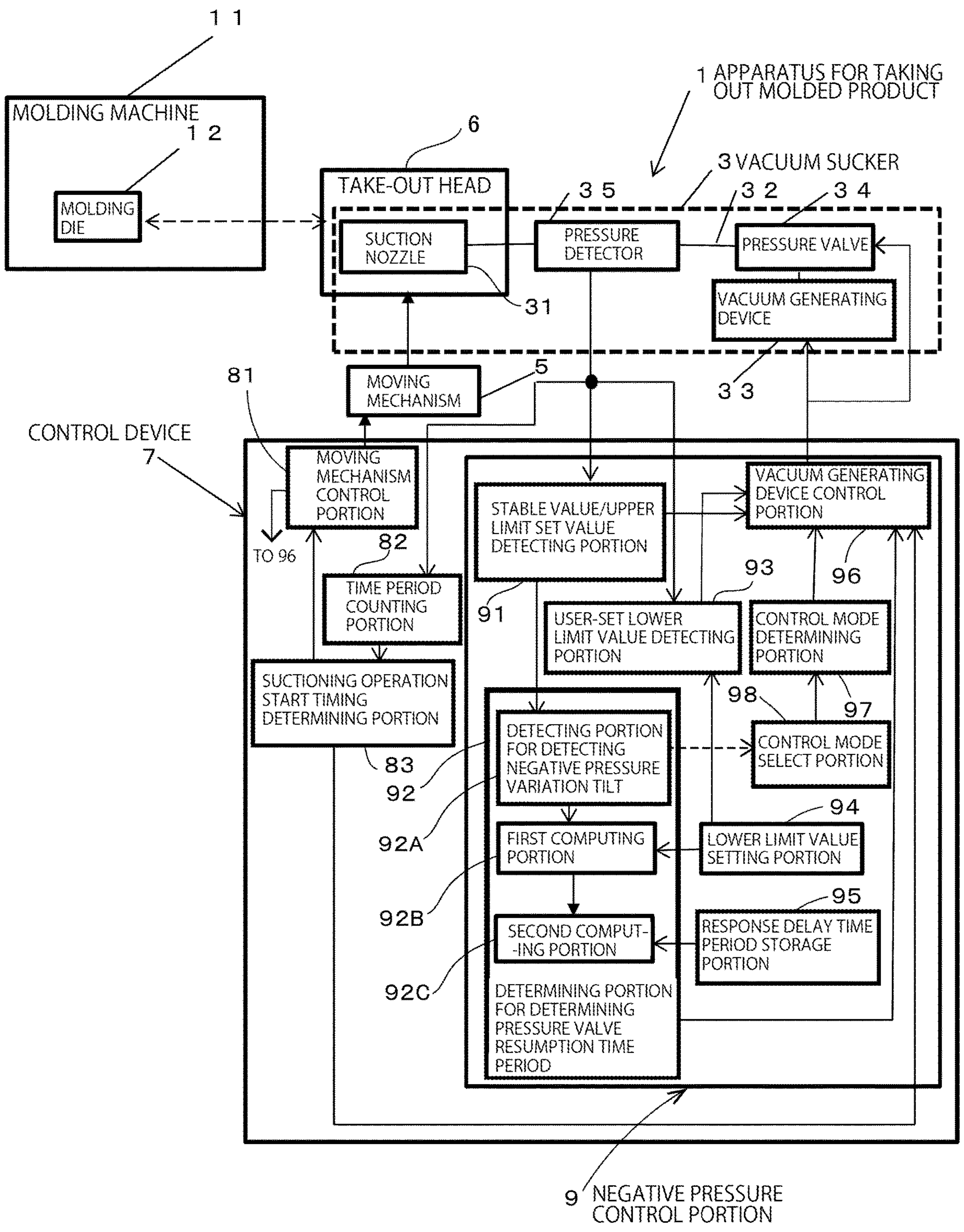
FIG. 1 is a block diagram illustrating the configuration of an apparatus for taking out a molded product according to an embodiment of the present invention, the apparatus being configured to take out a resin molded product from a resin molding machine, illustrating main components using blocks.

An apparatus for taking out a molded product according to an embodiment of the present invention will be described in detail below with reference to the drawings. FIG. 1 is a block diagram illustrating the configuration of an apparatus 1 for taking out a molded product according to an embodiment of the present invention, the apparatus being configured to take out a resin molded product from a resin molding machine 11, illustrating main components using blocks. The apparatus 1 for taking out a molded product (hereinafter simply referred to as "apparatus 1") includes a vacuum sucker 3, a moving mechanism 5, and a control device 7. The vacuum sucker 3 includes a suction nozzle 31 that serves as a suctioning portion operable to suck up a molded product, a vacuum generating device 33 connected to the suction nozzle 31 via an air flow path 32 to apply a vacuum pressure to the suction nozzle 31, a pressure valve 34 provided in the air flow path 32 between the vacuum generating device 33 and the suction nozzle 31 to allow and block communication between the vacuum generating device 33 and the suction nozzle 31, and a pressure detector 35 operable to detect a pressure in the air flow path 32 between the pressure valve 34 and the suction nozzle 31. The suction nozzle 31 is mounted on a take-out head 6 (attachment) that is moved by the moving mechanism 5.

Figure 2:
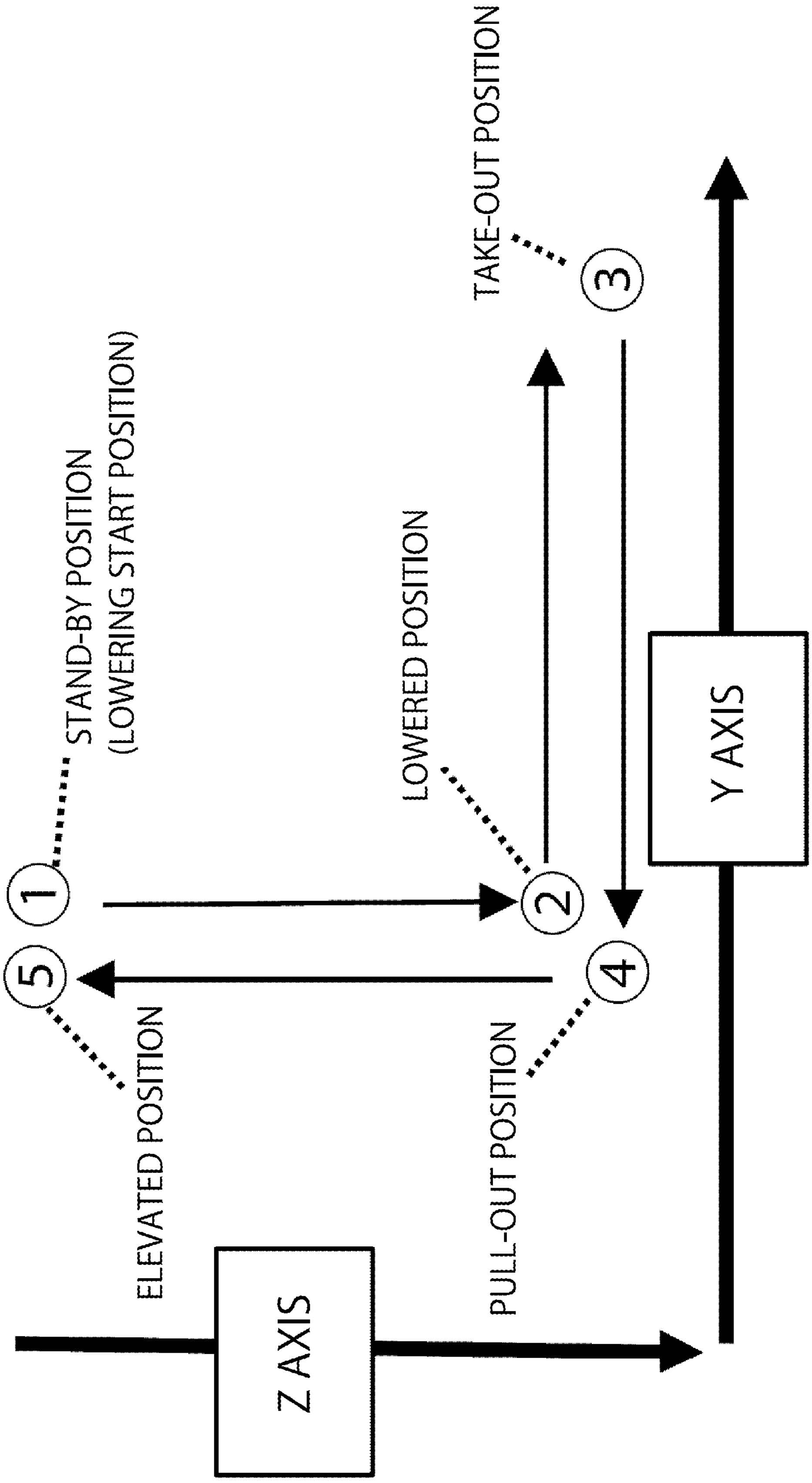
FIG. 2 illustrates the course of movement of a take-out head.

When the moving mechanism 5 is a known three-axis moving mechanism, that is, a moving mechanism with X, Y, and Z axes, and performs a take-out operation to take out a molded product as illustrated in FIG. 2, the moving mechanism 5 moves along the Z axis and the Y axis to move the take-out head 6 including the suction nozzle 31 in the order of a stand-by position (lowering start position), a lowered position, a take-out position, a pull-out position, and an elevated position. At the take-out position, the moving mechanism 5 takes out a molded product, which is pushed out of a molding die 12 of a molding machine 11 through a protruding operation of ejector pins, through suctioning by the suction nozzle 31. After that, the moving mechanism 5 moves the take-out head 6 with the suction nozzle 31 from the elevated position to a release position (not illustrated). At the release position, the suctioning by the suction nozzle 31 is canceled to release the molded product MP.

The control device 7 executes operation control for the vacuum generating device 33 and the pressure valve 34 and drive control for the moving mechanism 5. In the present embodiment, as illustrated in FIG. 1, the control device 7 includes a moving mechanism control portion 81 configured to control the moving mechanism 5, a time period counting portion 82 as will be discussed later, a suctioning operation start timing determining portion 83 configured to inform the moving mechanism control portion 81 of a suctioning operation start timing for starting a suctioning operation on the basis of an output from the time period counting portion 82, and a negative pressure control portion 9.

The negative pressure control portion 9 includes a stable value/upper limit set value detecting portion 91, a determining portion 92 for determining a pressure valve resumption time period including a detecting portion 92A for detecting a negative pressure variation tilt, a first computing portion 92B, and a second computing portion 92C, a user-set lower limit value detecting portion 93, a lower limit value setting portion 94, a response delay time period storage portion 95, a vacuum generating device control portion 96, a control mode determining portion 97, and a control mode select portion 98.

In the apparatus 1 according to the present embodiment, a negative pressure generating circuit is constituted from an air flow path 32 provided between the suctioning nozzle 31 and the vacuum generating device 33 to generate a negative pressure in a space formed between the suctioning nozzle 31 and the molded product, and a pressure valve 34 and a pressure detector 35, both of which are disposed in the air flow path 32, the negative pressure generating circuit having variation characteristics such that the negative pressure is reduced to an inflection point after the pressure valve 34 is opened and then is started increasing. The negative pressure control portion 9 controls the negative pressure by controlling the vacuum generating device 33 or the pressure valve 34. The negative pressure control portion 9 repeatedly performs on-off control in which a suctioning operation is started by opening the pressure valve 34 when a suctioning start instruction is received from the suctioning operation start timing determining portion 83, the suctioning operation is stopped by closing the pressure valve 34 when the negative pressure of air flowing through the air flow path 32 reaches a stable value or an upper limit set value, and thereafter the suctioning operation is resumed by opening the pressure valve 34, the on-off control being performed until the suctioning of the molded product by the suction nozzle 31 is canceled.

In the present embodiment, the negative pressure control portion 9 includes a determining portion 92 for determining a pressure valve resumption time period Tv that is used to resume the suctioning operation such that the inflection point in the characteristics of the negative pressure generating circuit does not become lower than the user-set lower limit value. The configuration and the function of the negative pressure control portion 9 will be described in detail after describing operations before the start of suctioning.

Operations Before Start of Suctioning

Figure 3:
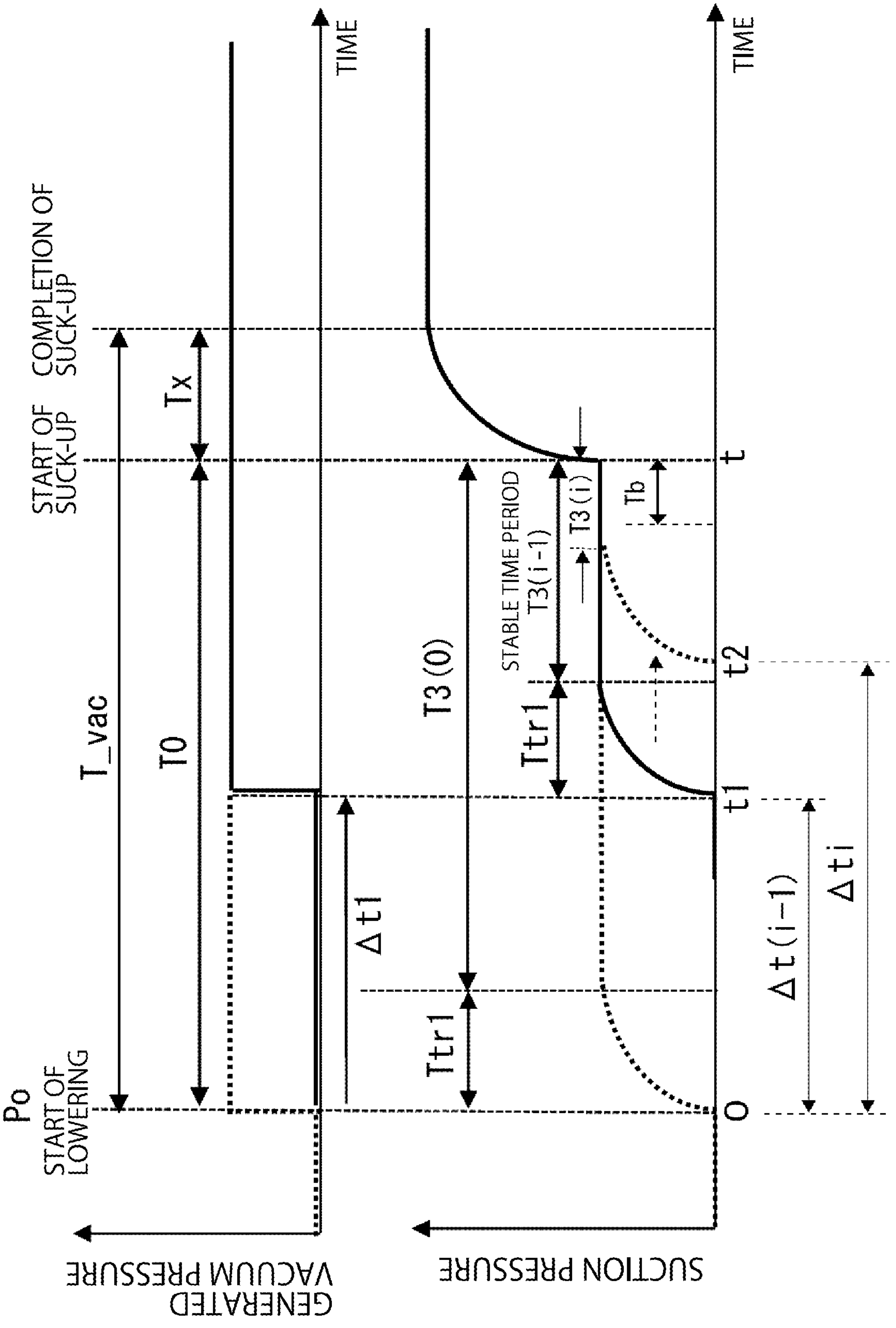
FIG. 3 illustrates variations in negative pressure during a suctioning operation.

An example of operations before the start of suctioning performed using the moving mechanism control portion 81 will be described with reference to FIG. 3. A time period since the pressure detector 35 detects a predetermined pressure until the pressure detector 35 detects a suctioning operation start pressure indicating that the suction nozzle 31 has started an operation to suck up the molded product is acquired as a reference time period T0, in the course of the vacuum generating device 33 starting a suctioning operation by opening the pressure valve at an initial suction start position P0 determined in advance and the moving mechanism 5 performing an operation to move the suction nozzle 31 closer to the molded product with the time when the suction nozzle 31 passes the initial suction start position P0 being defined as 0. A time period obtained by subtracting a total time period, T1=Ttr1+T3 where Ttr1 denotes a rising time period and T3 denotes a stable time period, from the reference time period T0 is defined as a delay time period Δt, and a suctioning operation start timing can be determined from the delay time period Δt. The time periods are counted by the time period counting portion 82.

It is recognized that the predetermined pressure has been reached, and a stable pressure has been reached, when a time period (corresponding to a bias time period Tb) for which the pressure in the air flow path 32 falls in a small variation width (Op) elapses, judging from the output from the pressure detector 35.

A stable time period T3 is varied among take-out cycles, since at least the operation time of the ejector pins is fluctuated. Therefore, a total time period T1=Ttr1+T3 is also varied. Since the output from the pressure detector 35 is slightly varied, it is determined that the stable pressure at which the suctioning operation start pressure can be correctly detected has been reached only when the bias time period Tb (during which the output from the pressure detector 35 is still slightly varied) elapses after the pressure in the air flow path 32 has reached the predetermined pressure. In the present embodiment, the suctioning operation start timing determining portion 83 determines the suctioning operation start timing such that the stable time period T3 is longer than the bias time period Tb. Thus, there is no fear of the occurrence of a fall error when a take-out operation is performed using the suctioning operation start timing determined by the suctioning operation start timing determining section 83.

In the present embodiment, in the course of the vacuum generating device 33 starting a suctioning operation by opening the pressure valve 34 and the moving mechanism 5 performing an operation to move the suction nozzle 31 closer to the molded product, the suctioning operation start timing determining section 83 of the control device 7 determines the suctioning operation start timing such that the stable time period T3 is longer than the bias time period Tb, the stable time period T3 being a time period since the pressure detector 35 detects the predetermined pressure until the pressure detector 35 detects a suctioning operation start pressure indicating that the suction nozzle 31 has started an operation to suck up the molded product. As illustrated in FIG. 3, in order to reduce the amount of air to be consumed during suction, specifically, the suctioning operation start timing determining section 83 of the control device 7 automatically performs an operation to bring the stable time period T3 closer to the bias time period Tb (an operation to vary the suctioning operation start timing from 0 to t1 and then to t2) by decreasing the total time period Ttr1+T3 by increasing a delay time period Δti (time period until a suctioning operation is started with the time when the suction nozzle 31 passes an initial suction start position P0 being defined as 0) each take-out cycle. However, it is necessary that this operation should be performed on condition that the stable time period T3 is longer than the bias time period Tb. When the suctioning operation start timing determining section 83 of the control device 7 determines the suctioning operation start timing such that the stable time period T3 is longer than the bias time period Tb, it is not necessary for an operator to determine the suctioning operation start timing (corresponding to the delay time period Δti), which allows the pressure detector 35 to operate without trouble to suppress a fall error, by himself/herself by trial and error.

Configuration and Operation of Negative Pressure Control Portion 9

Figure 4:
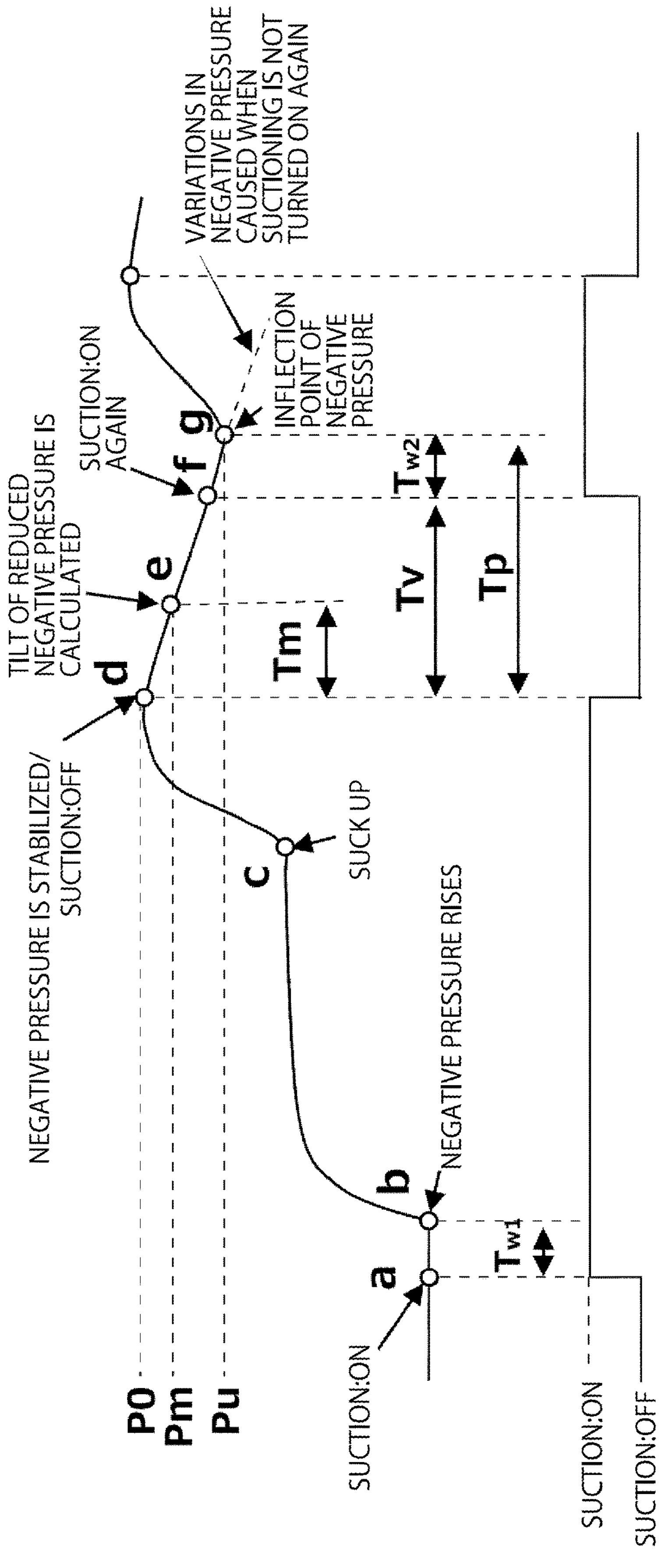
FIG. 4 illustrates the variations in negative pressure caused when on-off control is performed.

Variations in the characteristics of the negative pressure caused after the suction nozzle 31 starts suctioning and the on-off control performed by the negative pressure control portion 9 according to the present embodiment will be described. FIG. 4 illustrates the variation characteristics of the negative pressure generated by the suction nozzle 31. During a take-out operation, suctioning is started (point a) before a suction pad of the suction nozzle 31 abuts against a molded product. A negative pressure rises (point b in FIG. 4) a time period Tw1 after that, since it takes a certain time to discharge air in the air flow path. The time period Tw1 is called "idle-suctioning response period". When the suction pad of the suction nozzle 31 abuts against the molded product, the negative pressure further rises (point c), and thereafter suctioning is stopped when the negative pressure has become stable (point d). It can be determined whether or not the negative pressure has become stable (whether or not the negative pressure has reached a stable value) according to whether or not variations in the negative pressure have become a value that is close to 0. As a matter of course, an upper limit set value may be set in advance. The stable value/upper limit set value detecting portion 91 detects whether the negative pressure has reached a stable value or an upper limit set value. Upon this detection, the vacuum generating device control portion 96 outputs an instruction to close to the pressure valve 34 to stop suctioning.

The negative pressure is gradually reduced because of slight leakage of air from the air flow path etc. Therefore, the detecting portion 92A for detecting a negative pressure variation tilt calculates a tilt A of this reduction in the negative pressure at point e. Specifically, the tilt A is calculated from a pressure Po at the time (point d) when suctioning is stopped (suctioning is turned off) and a pressure Pm at the time when a predetermined time Tm has elapsed. The detecting portion 92A for detecting a negative pressure variation tilt calculates the tilt A of the negative pressure as A=Po−(Pm/Tm). The predetermined time Tm can be set as desired in the design stage.

The first computing portion 92B calculates an expected time period Tp since the point d at which suctioning is turned off until it is expected that the negative pressure exceeds an inflection point (point g) through computation using the tilt A. When the user-set lower limit value is defined as Pu, the first computing portion 92B can calculate the expected time period Tp using an equation Tp=(Po−Pu)/A, for example. The expected time period Tp is determined with point d at which suctioning is turned off being defined as time 0. The set value of the user-set lower limit value Pu is set by the lower limit value setting portion 94 implemented in a controller (not illustrated). When the user-set lower limit value detecting portion 93 detects that the negative pressure has reached the user-set lower limit value Pu, the vacuum generating device control portion 96 resumes the suctioning operation by the suction nozzle 31. In this case, the pressure valve is opened again on the basis of the set value of the user-set lower limit value Pu set by the user in priority to the result of the determination by the determining portion 92 for determining a pressure valve resumption time period. Since the user-set lower limit value Pu is a value in a safe range (a value in a high range) in which the molded product does not fall, however, no trouble is caused by giving priority to the value set by the user. In other words, priority is given to the result of determination by the determining portion 92 for determining a pressure valve resumption time period when the user-set lower limit value Pu is so low that the molded product may fall.

The second computing portion 92C determines the pressure valve resumption time period Tv through computation on the basis of the expected time period Tp. When a response delay time period that is necessary for the negative pressure to rise since the suctioning operation is resumed is defined as Tw2, the second computing portion 92C according to the present embodiment computes the pressure valve resumption time period Tv by an equation Tv=Tp−Tw2. The response delay time period Tw2 may be multiplied by a safety factor, as a matter of course. The computation can be performed easily and immediately using this type of equation. The response delay time period is stored in the response delay time period storage portion 95.

In the present embodiment, the pressure valve resumption time period Tv is determined such that the inflection point of the variation characteristics of the negative pressure does not become lower than the user-set lower limit value set by the worker. Thus, it is possible to give the worker a feeling that the timing to open the pressure valve is directly determined using the user-set lower limit value.

There may be more than one method of determining the response delay time period Tw2, and the response delay time period Tw2 may simply be a fixed value measured through advance testing. Alternatively, the response delay time period Tw2 may be an idle-suctioning response delay time period Tw1 measured when idle suctioning is performed during a test operation or an actual molding operation when the suctioning nozzle 31 is replaced. Further, the response delay time period Tw2 may be determined such that the pressure valve resumption time period Tv gradually comes close to the expected time period Tp in measurement in actual cycles.

Figure 5:
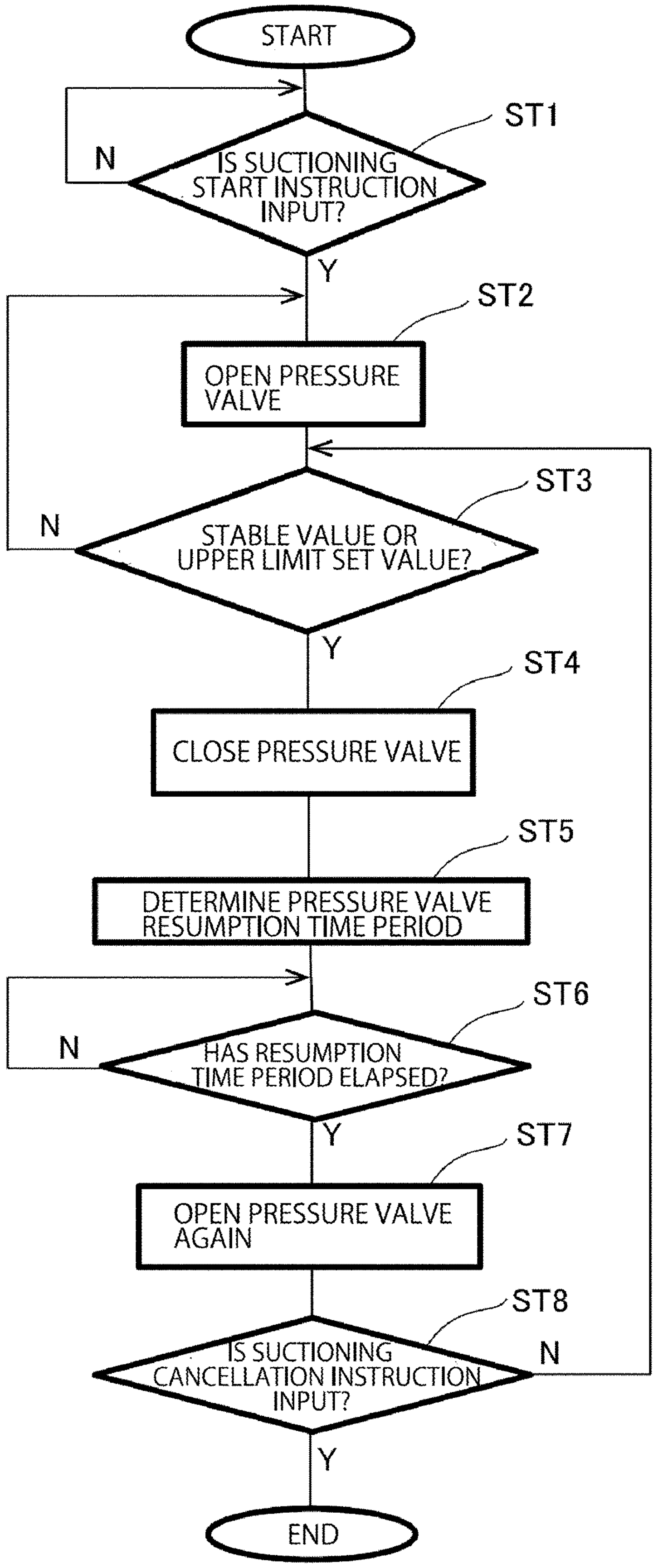
FIG. 5 is a flowchart illustrating an algorithm performed when the on-off control is performed.

FIG. 5 is a flowchart illustrating an algorithm of a program to be used when on-off control is implemented, in particular, by constituting the negative pressure control portion 9 using a computer. In this algorithm, the presence of an input of a suctioning start instruction is checked in step ST1. The suctioning start instruction is output from the suctioning operation start timing determining portion 83. When a suctioning start instruction is input, the pressure valve 34 is opened in step ST2, and the negative pressure is increased (the negative pressure becomes higher). When the pressure valve 34 is opened, it is determined in step ST3 whether or not the negative pressure has reached a stable value or an upper limit set value. This determination is executed by the stable value/upper limit set value detecting portion 91. When the negative pressure reaches a stable value or an upper limit set value, the pressure valve 34 is closed in step ST4, and the negative pressure starts decreasing (the negative pressure becomes lower). Then, a pressure valve resumption time period Tv is determined in step ST5. This step is executed by the determining portion 92 for determining a pressure valve resumption time period. When it is determined in step ST6 that the pressure valve resumption time period Tv has elapsed, the pressure valve 34 is opened again in step ST7. After that, the negative pressure is further decreased, and then is increased (becomes higher) after the inflection point. Steps ST3 to ST8 are repeatedly performed until a suctioning cancellation instruction is input. The on-off control is performed in this manner. When a suctioning cancellation instruction is output from the moving mechanism control portion 81, suctioning of the molded product is canceled at the release position.

The algorithm in FIG. 5 functions when the molded product falls if the user-set lower limit value set by the user is used. If the user-set lower limit value is a value that does not cause the molded product to fall, the vacuum generating device control portion 96 starts to open the pressure valve again at the timing when the user-set lower limit value detecting portion 93 detects that the negative pressure has reached the user-set lower limit value, and thereafter the on-off control is executed on the basis of the user-set lower limit value. After a suctioning cancellation instruction is output, the suctioning of the molded product may be canceled after the on-off control is finished as a matter of course, rather than the suctioning is immediately canceled.

In the present embodiment, the negative pressure control portion 9 includes a control mode select portion 98 and a control mode determining portion 97 to be able to select a power reduction mode to reduce power consumption by the vacuum generating device by performing on-off control on the pressure valve 34, a non-power reduction mode in which the on-off control is not performed, and a medium power reduction mode in which the on-off control on the pressure valve is variably performed so that the power consumption is higher than that in the power reduction mode and lower than that in the non-power reduction mode. The on-off control is performed when the control mode selected by the control mode select portion 98 is the power reduction mode or the medium power reduction mode. When the selected control mode is the non-power reduction mode, the vacuum generating device control portion 96 does not perform the on-off control. When mode selection is allowed, the control mode can be selected according to the shape of the molded product or the performance of the suctioning portion, and thus the occurrence of a molded product fall error can be suppressed.

The control mode can be automatically selected if the control mode determining portion 97 has a function of automatically selecting the non-power reduction mode, the power reduction mode, or the medium power reduction mode according to the shape of the molded product or the performance of the suctioning portion.

Figure 6:
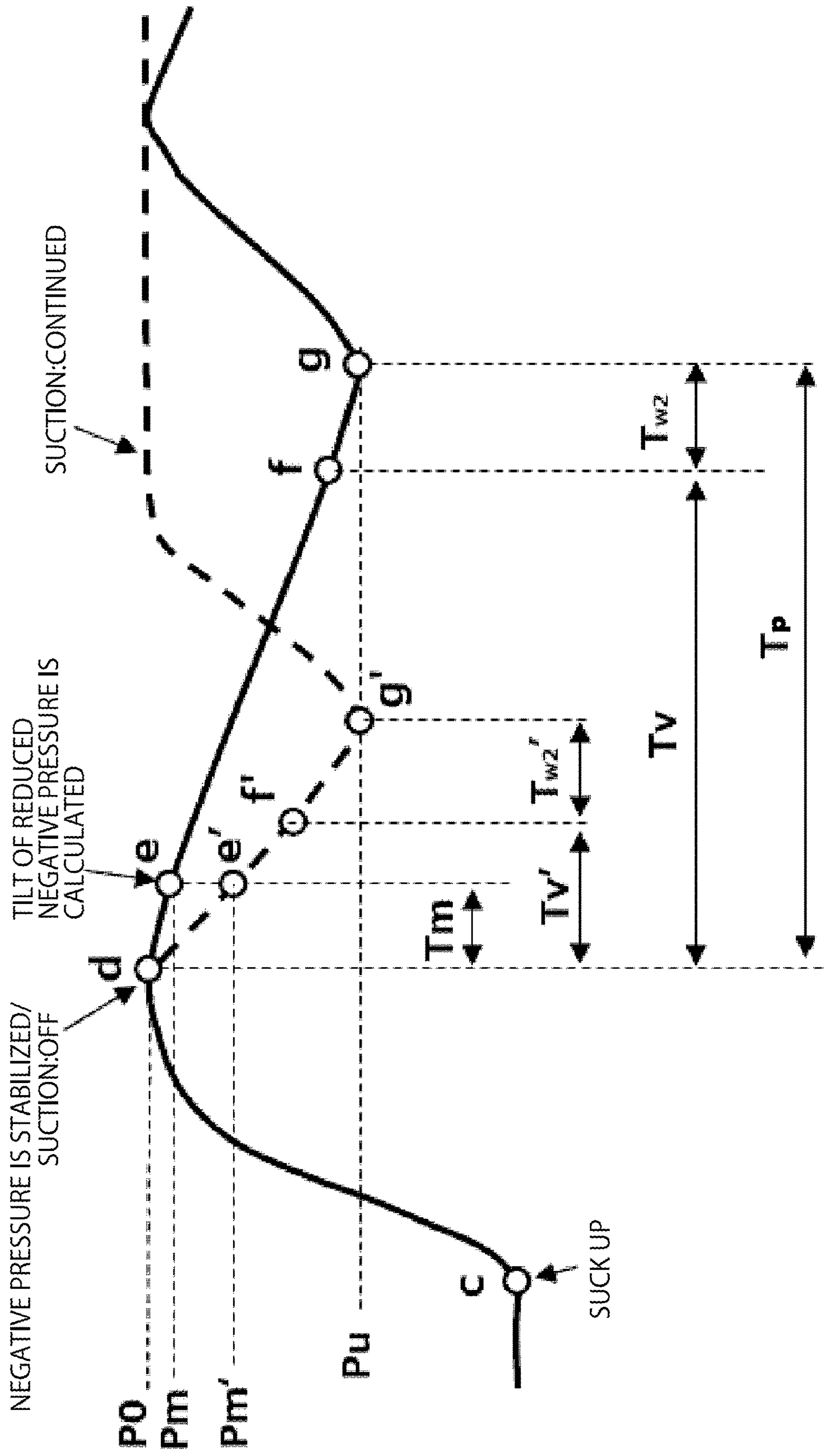
FIG. 6 illustrates variations in negative pressure at the normal time (solid line) and at the time when vacuum leakage occurs (broken line) under a condition that a power reduction mode is selected.

An example in which the control mode determining portion 97 automatically selects the non-power reduction mode, the power reduction mode, or the medium power reduction mode will be described below with reference to FIG. 6. The worker naturally desires to obtain the maximum energy saving effect as long as the molded product can be stably sucked up. However, “vacuum leakage” may occur due to the effect of a tear in the pad of the suction nozzle etc. FIG. 6 illustrates variations in negative pressure at the normal time (solid line) and at the time when vacuum leakage occurs (broken line) under a condition that the power reduction mode is selected. At the normal time (solid line), after the suctioning is turned off, the pressure valve 34 is turned on after the negative pressure reaches the user-set lower limit value Pu, and the pressure valve is turned on again after the negative pressure exceeds the inflection point (point g). After that, the pressure valve is repeatedly turned on and off in this state. When vacuum leakage occurs, the negative pressure is decreased faster than at the normal time, and the tilt A of variations in the negative pressure becomes larger. The detecting portion 92A for detecting a negative pressure variation tilt calculates the tilt A of this reduction in the negative pressure at point e'. As discussed earlier, the tilt A is calculated from the pressure Po at the time (point d) when the suctioning is stopped (turned off) by closing the pressure valve 34 and the pressure Pm at the time when the predetermined time Tm has elapsed. In this case, the pressure may fall to a level at which the molded product cannot be kept being sucked up before the negative pressure starts increasing if suctioning is started again with reference to the user-set lower limit value Pu as indicated by the broken line in FIG. 6. Thus, a pressure valve resumption time period Tv' is set such that the negative pressure does not become lower than the user-set lower limit value Pu by determining the occurrence of vacuum leakage using the tilt A of variations in the negative pressure and automatically switching from the power reduction mode to the medium power reduction mode. As a result, when the tilt A of variations in the negative pressure is large, the pressure valve resumption time period Tv' which is advanced as illustrated in the drawing is used, compared to the pressure valve resumption time period Tv at the normal time. This suppresses fall of the product. In this case, the tilt A of variations in the negative pressure is measured at the timing when the predetermined time Tm has elapsed, and the negative pressure is Pm' when vacuum leakage occurs, compared to the negative pressure Pm at the normal time. At this time, the tilt of the negative pressure is obtained as (P0-Pm')/Tm. When the tilt A of variations in the negative pressure becomes larger than a predetermined tilt set in advance, suctioning is started earlier than the negative pressure reaches the user-set lower limit value Pu according to the magnitude of the tilt A. After that, a transition may be made to the non-power reduction mode (continuous suctioning) at least until the product is released, or to the medium power reduction mode (the pressure valve is turned on earlier than in the power reduction mode and repeatedly turned on and off) at least until the product is released.

After the mode transition, the mode after the transition may be held, or the above mode transition may be made according to the result of detecting the tilt A of variations in the reduced negative pressure in each cycle. When the power reduction mode is selected, the product can be stably taken out even if an abnormality such as vacuum leakage occurs (or there has been an abnormality from the beginning).

When the magnitude of the tilt A of variations in the negative pressure is not significantly varied from a normal value (even in consideration of fluctuations in the tilt of the reduced negative pressure caused in each suctioning), it is occasionally possible to determine that the product can be stably taken out even if setting is changed to the medium power reduction mode. In such a case, the medium power reduction mode which is superior to the non-power reduction mode is preferably selected.

Figure 7:
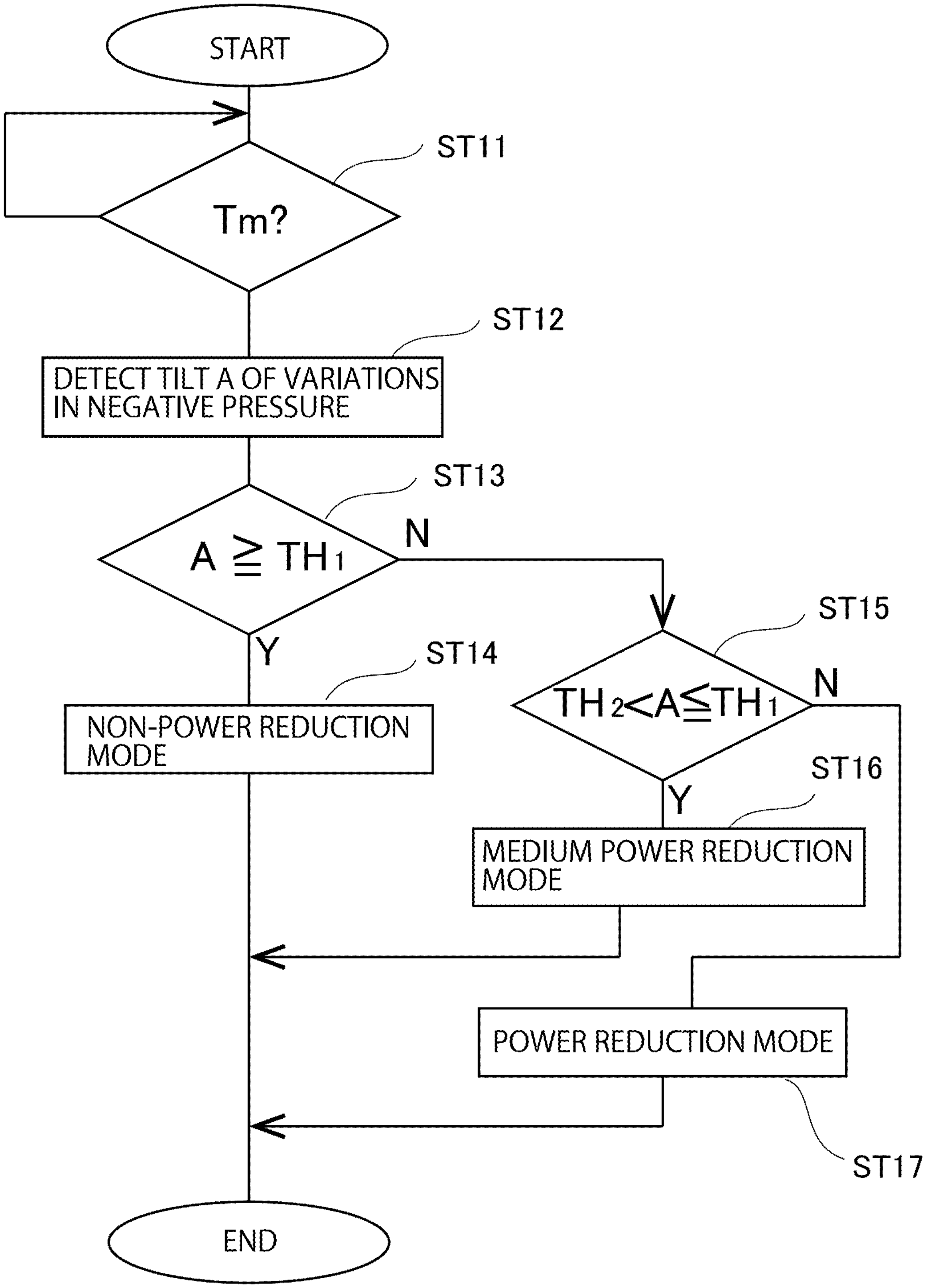
FIG. 7 is a flowchart illustrating an algorithm performed when automatic selection is performed.

FIG. 7 is a flowchart illustrating an algorithm performed when automatic selection is performed. In the present embodiment, this algorithm can be executed by the control mode determining portion 97. Thresholds TH1 and TH2 in steps ST13 and ST15 in FIG. 7 may be set during designing, or may be obtained by multiplying the tilt at the normal time by a predetermined multiplication factor (e.g. 1.2). Steps ST11 to ST17 in the algorithm for automatic selection illustrated in FIG. 7 are exemplary, and the present invention is not limited to use of the algorithm in FIG. 7.

Factors of a significant reduction in the negative pressure include not only vacuum leakage in negative pressure devices, but also the manner of contact between the molded product and the suction pad and the shape of the molded product (an abrupt reduction in the negative pressure tends to occur in a porous portion or a groove portion, for example). However, it is difficult for an unskilled person to make advance settings by manually selecting a control mode in consideration of such factors. However, automatic selection allows automatic mode switching according to the actual state of reduction in the negative pressure. Thus, the energy saving effect can be achieved as much as possible according to the situation, and the opportunities to use the energy saving function can be increased.

When the control mode is manually selectable, the operator can select not to perform the on-off control, which makes it possible to respect the intention of a skilled operator.

INDUSTRIAL APPLICABILITY

According to the present invention, the pressure valve resumption time period Tv is determined such that the inflection point of the variation characteristics of the negative pressure does not become lower than the user-set lower limit value set by the worker. Thus, it is possible to give the worker a feeling that the timing to open the pressure valve is directly determined using the user-set lower limit value. It is possible to obtain an advantage that the work of setting the user-set lower limit value can be performed easily and smoothly compared to the related art.

What is claimed is:

1. An apparatus for taking out a molded product, comprising:

an attachment including a suctioning portion operable to suction a molded product in a die of a molding machine;

a moving mechanism operable to move the attachment according to an operation sequence determined in advance;

a moving mechanism control portion configured to control the moving mechanism;

a negative pressure generating circuit including an air flow path provided between the suctioning portion and a vacuum generating device to generate a negative pressure in a space formed between the suctioning portion and the molded product, and a pressure valve and a pressure detector, both of which are disposed in the air flow path, the negative pressure generating circuit having variation characteristics such that the negative pressure is reduced to an inflection point after the pressure valve is opened and then is started increasing; and a negative pressure control portion configured to control the negative pressure by controlling the vacuum generating device or the pressure valve, wherein:

the negative pressure control portion is configured to repeatedly perform on-off control in which a suctioning operation is started by opening the pressure valve when a suctioning start instruction is received, the suctioning operation is stopped by closing the pressure valve when the negative pressure of air flowing through the air flow path reaches a stable value or an upper limit set value, and thereafter the suctioning operation is resumed by opening the pressure valve on a basis of a user-set lower limit value that is lower than the stable value or the upper limit set value;

the negative pressure control portion includes a determining portion configured to determine a pressure valve resumption time period that is used to resume the suctioning operation such that the inflection point does not become lower than the user-set lower limit value; and the negative pressure control portion repeatedly performs an off operation to keep the pressure valve closed until the pressure valve resumption time period elapses after the suctioning operation is stopped and an on operation to open the pressure valve and keep the pressure valve open until the negative pressure reaches the stable value or the upper limit set value in the on-off control; and wherein the determining portion includes:

a detecting portion for detecting a negative pressure variation tilt configured to detect a tilt of variations in the negative pressure immediately after the negative pressure starts reducing;

a first computing portion configured to compute an expected time period since the negative pressure starts reducing until the negative pressure is expected to exceed the inflection point on a basis of a value of the negative pressure at a time when the negative pressure starts reducing, the user-set lower limit value, and the tilt; and a second computing portion configured to determine the pressure valve resumption time period on a basis of the expected time period.

2. The apparatus for taking out a molded product according to claim 1, wherein the second computing portion computes the pressure valve resumption time period on a basis of the expected time period and a response delay time period that is necessary for the negative pressure to rise since the suctioning operation is resumed.

3. The apparatus for taking out a molded product according to claim 2, wherein the response delay time period is a fixed value measured through advance testing.

4. The apparatus for taking out a molded product according to claim 2, wherein the response delay time period is an idle-suctioning response delay time period measured when idle suctioning is performed during a test operation or an actual molding operation when the suctioning portion is replaced.

5. The apparatus for taking out a molded product according to claim 2, wherein the response delay time period is determined such that the pressure valve resumption time period gradually comes close to the expected time period in measurement in actual cycles.

6. The apparatus for taking out a molded product according to claim 1, wherein the negative pressure control portion is configured to be able to select a power reduction mode to reduce power consumption by the vacuum generating device by performing on-off control on the pressure valve, a non-power reduction mode in which the on-off control is not performed, or a medium power reduction mode in which the on-off control on the pressure valve is variably performed so that the power consumption is higher than that in the power reduction mode and lower than that in the non-power reduction mode.

7. The apparatus for taking out a molded product according to claim 6, wherein the negative pressure control portion further includes a control mode determining portion configured to automatically determine the non-power reduction mode, the power reduction mode, or the medium power reduction mode.

8. The apparatus for taking out a molded product according to claim 7, wherein the control mode determining portion detects the negative pressure at a time of start of operation, and selects and determines one of the non-power reduction mode, the power reduction mode, and the medium power reduction mode according to a tilt of variations in the detected negative pressure.

9. The apparatus for taking out a molded product according to claim 7, wherein the control mode determining portion detects variations in the negative pressure during operation, and selects and determines one of the non-power reduction mode, the power reduction mode, and the medium power reduction mode according to a tilt of the detected variations in the negative pressure.

* * * * *